United States Patent
Kawanago

(10) Patent No.: US 10,634,611 B2
(45) Date of Patent: Apr. 28, 2020

(54) MEASURING APPARATUS

(71) Applicant: CANON KABUSHIKI KAISHA, Tokyo (JP)

(72) Inventor: Hiroshi Kawanago, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/785,753

(22) Filed: Oct. 17, 2017

(65) Prior Publication Data

US 2018/0113073 A1   Apr. 26, 2018

(30) Foreign Application Priority Data

Oct. 21, 2016   (JP) ................. 2016-207260

(51) Int. Cl.
| | | |
|---|---|---|
| *G01N 21/55* | (2014.01) | |
| *G01N 21/47* | (2006.01) | |
| *H04N 7/18* | (2006.01) | |
| *G01N 21/57* | (2006.01) | |

(52) U.S. Cl.
CPC ........... *G01N 21/55* (2013.01); *G01N 21/474* (2013.01); *H04N 7/183* (2013.01); *G01N 21/57* (2013.01)

(58) Field of Classification Search
None
See application file for complete search history.

(56) References Cited

U.S. PATENT DOCUMENTS

| | | |
|---|---|---|
| 7,626,709 B2 | 12/2009 | Schwarz et al. |
| 9,719,922 B2 | 8/2017 | Seki et al. |
| 2006/0256341 A1 | 11/2006 | Kuwada |
| 2009/0046300 A1* | 2/2009 | Schwarz .............. G01N 21/474 356/600 |
| 2014/0036067 A1* | 2/2014 | Otsuka ..................... G01C 3/08 348/135 |

(Continued)

FOREIGN PATENT DOCUMENTS

| | | |
|---|---|---|
| EP | 2913659 A1 | 9/2015 |
| JP | H0771945 A | 3/1995 |
| JP | 2006030203 A | 2/2006 |

OTHER PUBLICATIONS

Extended European Search Report issued in European Application No. 17195391.2 dated Dec. 20, 2017.

(Continued)

*Primary Examiner* — Talha M Nawaz
(74) *Attorney, Agent, or Firm* — Rossi, Kimms & McDowell LLP

(57) ABSTRACT

The present invention provides a measuring apparatus having a housing in which an opening is formed, and measuring a reflection characteristic of a target region to be measured via the opening, the apparatus comprising an imaging device provided in the housing, and configured to capture an image of an imaging region via the opening, a detector configured to detect light reflected from the target region, which is a portion of the imaging region, a processor configured to obtain a reflection characteristic of the target region based on the light detected by the detecting unit, and a display unit configured to display the image of the imaging region captured by the imaging unit, wherein the image of the imaging region displayed by the display unit includes information indicating the target region.

18 Claims, 6 Drawing Sheets

(56) References Cited

U.S. PATENT DOCUMENTS

2015/0350615 A1* 12/2015 Ono .................... G06F 3/0418
                                                        348/140
2016/0324423 A1* 11/2016 Irisawa ............... A61B 8/0891
2019/0191153 A1*  6/2019 Speigle .................. G09G 3/34

OTHER PUBLICATIONS

Mizrach et al., "Gloss Evaluation of Curved-surface Fruits and Vegetables", Food Bioprocess Technol, Apr. 19, 2008: 300-307; vol. 2; Springer Science + Business Media, LLC. Cited in NPL 1.

* cited by examiner

MEASURING APPARATUS

BACKGROUND OF THE INVENTION

Field of the Invention

The present invention relates to a measuring apparatus for measuring a reflection characteristic of a surface.

Description of the Related Art

For the evaluation of a surface such as a printing surface, a painted surface, and an exterior surface of a product, reflection characteristics such as cloudiness, diffusion, gloss, or color which are specified by JIS or ISO are used as indicators. To measure such reflection characteristics, a measuring apparatus that has a light source that irradiates light onto a measurement target surface, and a sensor for detecting light reflected by the measurement target surface is known (refer to Japanese Patent Laid-Open No. 2006-30203).

It is desirable that a reflection characteristic measuring apparatus as described above performs measurement in a state where external light is blocked by a housing. However, in such a state, there is a disadvantage in operability of the measuring apparatus in that a region for which the reflection characteristics are to be measured cannot be seen, and thus relative positioning between the measuring apparatus and the target region for which the reflection characteristics are to be measured is difficult.

SUMMARY OF THE INVENTION

The present invention provides a measuring apparatus that is advantageous in operability, for example.

According to one aspect of the present invention, there is provided a measuring apparatus having a housing in which an opening is formed, and measuring a reflection characteristic of a target region to be measured via the opening, the apparatus comprising: an imaging device provided in the housing, and configured to capture an image of an imaging region via the opening; a detector configured to detect light reflected from the target region, which is a portion of the imaging region; a processor configured to obtain a reflection characteristic of the target region based on the light detected by the detecting unit; and a display unit configured to display the image of the imaging region captured by the imaging unit, wherein the image of the imaging region displayed by the display unit includes information indicating the target region.

Further features of the present invention will become apparent from the following description of exemplary embodiments with reference to the attached drawings.

DESCRIPTION OF THE EMBODIMENTS

Figure 1:
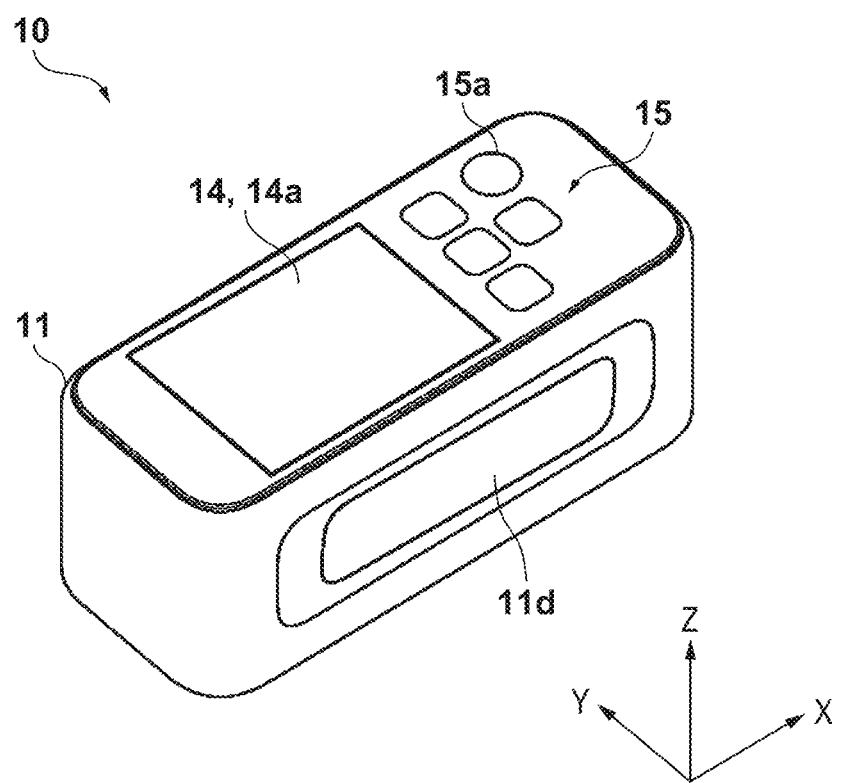
FIG. 1 is a perspective view of a measuring apparatus.

Exemplary embodiments of the present invention will be described below with reference to the accompanying drawings. Note that the same reference numerals denote the same members throughout the drawings, and a repetitive description thereof will not be given.

First Embodiment

Figure 2:
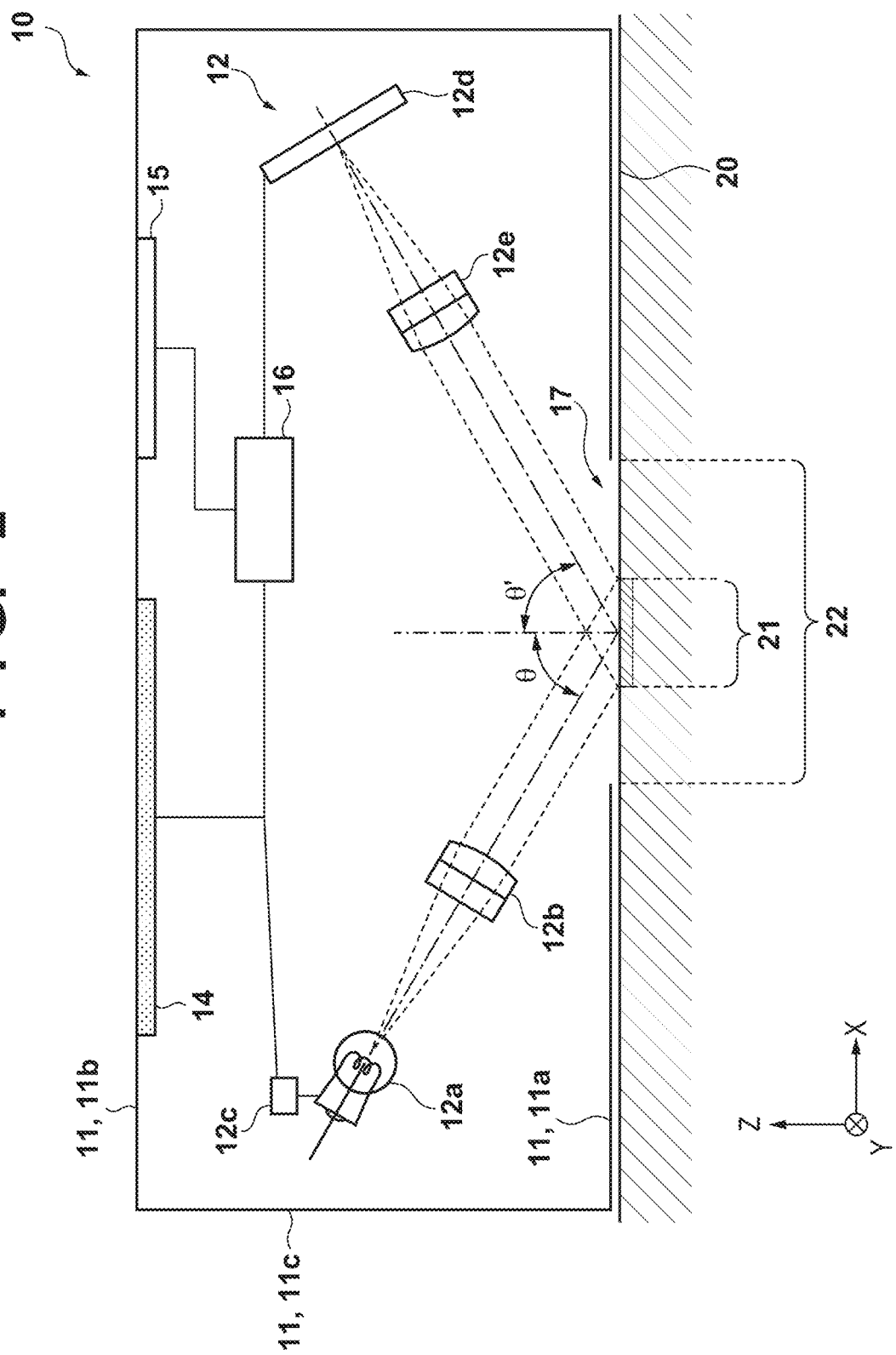
FIG. 2 is a view of an internal configuration of the measuring apparatus from the viewpoint of the Y direction.
Figure 3:
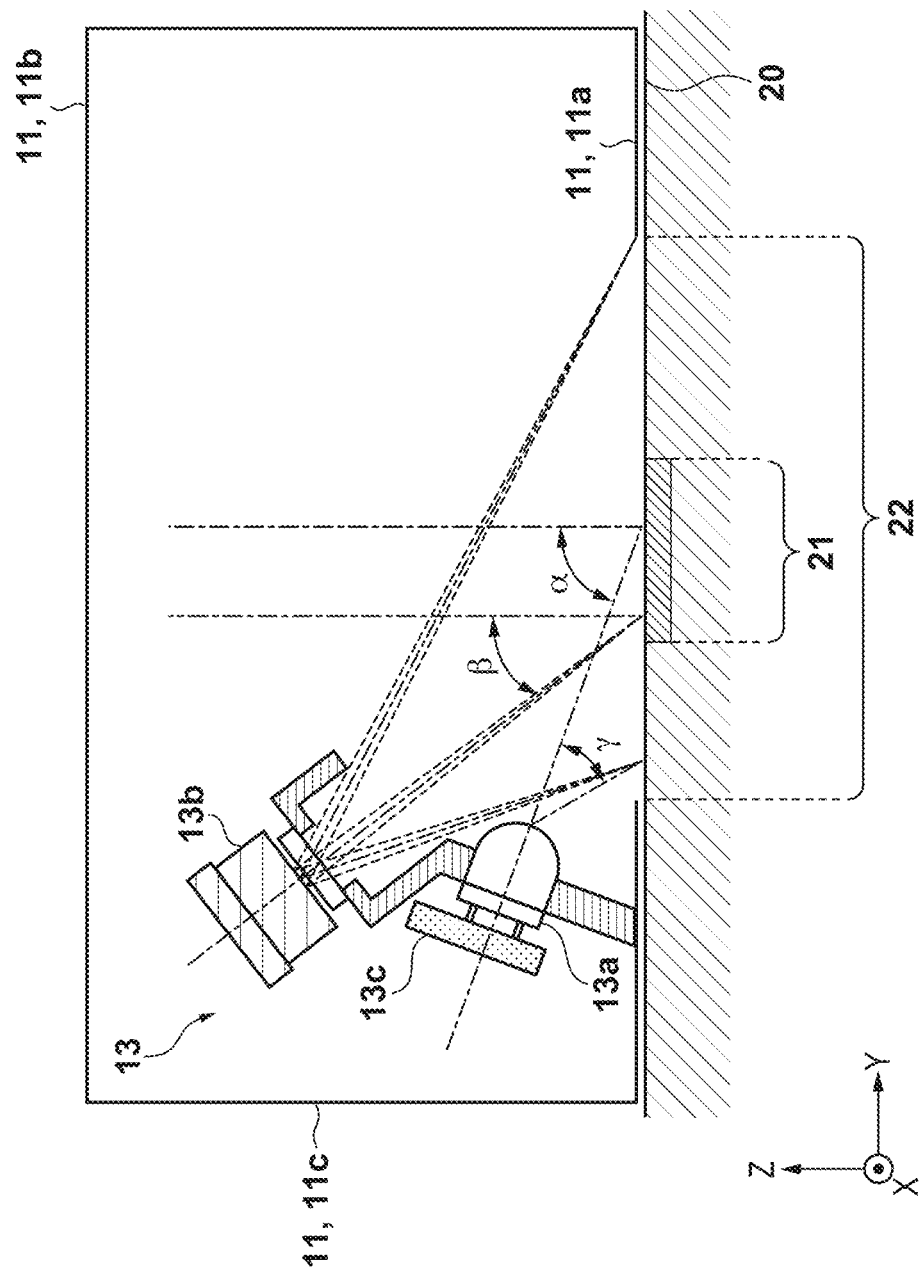
FIG. 3 is a view of an internal configuration of the measuring apparatus from the viewpoint of the X direction.

While referring to FIG. 1 through FIG. 3, explanation is given regarding a measuring apparatus 10 of a present embodiment according to the present invention. FIG. 1 is a perspective view of a measuring apparatus 10 of the present embodiment, FIG. 2 is a view of an internal configuration of the measuring apparatus 10 seen from the Y direction, and FIG. 3 is a view of the internal configuration of the measuring apparatus 10 seen from the X direction. The measuring apparatus 10 includes, for example, a housing 11, a detecting unit 12 (a detector), imaging unit 13 (an image capturing unit), a display unit 14, an operating unit 15 (an input unit), and a control unit 16 (a controller), and measures reflection characteristics of a measurement target surface 20 via an opening 17 of the housing 11 in a state where external light is blocked by the housing 11. Here, the reflection characteristics can include at least one of a specular gloss, haze, a DOI (Distinctness of Image), and image clarity. In addition, the imaging unit 13 may include an optical system (an imaging optical system) that contributes in image sensing. In addition, the control unit 16 includes an MCU (Micro Controller Unit) that has a CPU and a memory (a storage unit) for example, and controls each unit of the measuring apparatus 10. Here, in the measuring apparatus 10 of the present embodiment, the control unit 16 has a function as a processor that obtains (determines) reflection characteristics of the measurement target surface 20 (a first partial region 21) based on a detection result by the detecting unit 12, but there is no limitation to this, and the processor may be provided separately to the control unit 16. In addition, the control unit 16 may include an FPGA (Field Programmable Gate Array), a DSP (Digital Signal Processor), or the like instead of the MCU (or as well as the MCU).

The housing 11 has a first face 11a in which the opening 17 is formed, a second face 11b on a side opposite the first face 11a, and a side face 11c, for example. The first face 11a is placed on the measurement target surface to be on a side of the measurement target surface (the first face 11a faces the measurement target surface). The detecting unit 12, the imaging unit 13, and the control unit 16 are provided in the housing, and the display unit 14 (a display 14a) and the operating unit 15 (a group of buttons) are provided on the second face 11b of the housing 11. With regards to operability, it is desirable that the display unit 14 and the operating unit 15 are provided adjacent to each other on the housing (the second face 11b). In addition, a concave portion 11d (a grip portion) for making it easy for a user's fingers to catch and grip is formed on the side face 11c of the housing 11. Here, the concave portion 11d (the grip portion) and the operating unit 15 are provided (arranged) on the housing 11 so that a user can operate the operating unit 15 (the group of buttons) while gripping the side face 11c (the concave portion 11d) of the housing 11. It can be said that the concave portion 11d and the operating unit 15 which are arranged in this way are provided adjacent to each other on the housing.

The detecting unit 12 irradiates light onto the first partial region 21 (a part of a region of the measurement target surface 20 that is sensed by the imaging unit 13 which is described later) out of a region of the measurement target surface 20 where the opening 17 of the housing 11 is positioned, and detects light reflected by the first partial region 21. The detecting unit 12 can include an irradiation unit for irradiating light onto the first partial region 21, and a light receiving unit for receiving light reflected by the first partial region 21, for example. The irradiation unit includes a light source 12a and a lens 12b, and irradiates light onto the first partial region 21. The light source 12a is connected to the light source control circuit 12c, and a light emission intensity is adjusted in accordance with a signal sent from the control unit 16 to the light source control circuit 12c. Light emitted from the light source 12a is incident on the first partial region 21 after being collimated to parallel light by the lens 12b. In addition, the light receiving unit (a measuring unit) includes a sensor (a light receiving element and a light conversion element) 12d and a lens (measurement optical system) 12e, and receives (detects) light reflected by the first partial region 21. The sensor 12d includes an area sensor in which photoelectric conversion elements configured by CCD or CMOS sensors, for example, are arranged two-dimensionally, receives light that is reflected by the first partial region 21 and focused by the lens 12e, and detects an intensity distribution of the light reflected from the first partial region 21. Accordingly, the control unit 16 (a processing unit) can obtain a reflection characteristic of the first partial region 21, based on intensity distribution data (the detection result by the detecting unit 12) of the reflected light that is outputted from the sensor 12d.

A value (a standardized value) indicating a reflection characteristic of the first partial region 21 that is obtained by the control unit 16 (a processing unit) is displayed by the display unit 14. The display unit 14 includes a display 14a that is an LCD or the like and is provided on the second face 11b of the housing 11, for example, and displays the value indicating the reflection characteristic of the first partial region 21 on the display 14a. Accordingly, a user can see the reflection characteristic of the first partial region 21. In addition, various settings such as operation conditions of the measuring apparatus 10 are performed by a user operating the operating unit 15. The operating unit 15 includes a plurality of buttons that are provided on the second face 11b of the housing 11. For example, the control unit 16 starts measurement of a reflection characteristic of the measurement target surface 20 by detecting a signal (a signal inputted by the operating unit 15) generated by a button 15a out of the plurality of buttons of the operating unit 15 being pressed by a user. The operating unit 15 of the present embodiment has a plurality of buttons, but there is no limitation to this, and configuration may be taken to have the display 14a of the display unit 14 be a touch panel, and use the display 14a as the operating unit 15, for example.

Here, when measuring the reflection characteristic of the measurement target surface 20, an incident angle θ of light that is caused to be incident on the measurement target surface 20 (a reflection angle θ' that light that is reflected by the measurement target surface 20) is specified for each standard of the reflection characteristic, in accordance with JIS, ISO, or the like. For example, in the case of measuring specular gloss as the reflection characteristic, the incident angle θ (the reflection angle θ') is specified as any of 20 degrees, 45 degrees, 60 degrees, 75 degrees, and 85 degrees. In addition, in the case of measuring haze as the reflection characteristic, the incident angle θ (the reflection angle θ') is specified as either 20 degrees or 30 degrees. In a case of measuring image clarity as the reflection characteristic, the incident angle θ (the reflection angle θ') is specified as either 45 degrees or 60 degrees. In a case of measuring DOI as the reflection characteristic, the incident angle θ (the reflection angle θ') is specified as either 20 degrees or 30 degrees.

In the measuring apparatus 10 of the present embodiment (the example illustrated in FIG. 2), one detecting unit 12 is provided and measurement of a reflection characteristic of the measurement target surface 20 is performed at one incident angle θ (the reflection angle θ'). However, the incident angle θ (the reflection angle θ') is specified for each reflection characteristic standard as described above. Therefore, a plurality of detecting units 12 for whose incident angles θ (reflection angles θ') are different to each other may be provided in the measuring apparatus 10 so that it is possible to measure reflection characteristics of the measurement target surface 20 by a plurality of incident angles θ (reflection angles θ'). For example, when a detecting unit 12 for which the incident angle θ (the reflection angle θ') is 20 degrees and a detecting unit 12 for which the incident angle θ (the reflection angle θ') is 60 degrees are provided in the measuring apparatus 10, it is possible to measure all of specular gloss, haze, image clarity, and DOI. In addition, there is no limitation to providing a plurality of detecting units 12, and configuration may be taken to provide a driving unit for driving one detecting unit 12 in the measuring apparatus 10 so that it is possible to change the incident angle θ (the reflection angle θ') of the one detecting unit 12.

Here, viewing the measuring apparatus 10 described in FIG. 2, the light receiving unit (the measuring unit) includes the sensor 12d and the lens (measurement optical system) 12e, and receives (detects) light reflected by the first partial region 21. The sensor 12d includes an area sensor in which photoelectric conversion elements configured by CCD or CMOS sensors, for example, are arranged two-dimensionally, and receives light that is reflected by the first partial region 21 and focused by the lens 12e. The measuring apparatus 10 turns on the light source 12a which is for measurement, and measures a reflection characteristic of the measurement region (a region of a portion of the measurement target surface). The cross section of FIG. 2 includes a normal line of the sensor 12d which is for measurement or an optical axis of the lens 12e which is for measurement, and is a cross section that is parallel to the normal line of the measurement target surface.

In this way, because measurement of the reflection characteristic is performed in a state where external light is blocked by the housing 11, it is not possible to see the measurement region (the first partial region 21 for which reflected light is detected by the detecting unit 12) for which the reflection characteristic is measured. Accordingly, in a conventional measuring apparatus, it was difficult to correctly position (relative positioning between a target region and the measuring apparatus) the measuring apparatus so that a measurement region is arranged on a target region for which a reflection characteristic is to be measured. Accordingly, the measuring apparatus 10 of the present embodiment has the imaging unit 13 for sensing the measurement target surface 20 via the opening 17 of the housing 11. Specifically, the imaging unit 13 senses a second partial region (an imaging region) 22 that includes the first partial region 21 out of a region of the measurement target surface 20 on which the opening 17 of the housing 11 is positioned. An image of the second partial region 22 obtained by the imaging unit 13 is displayed on the display unit 14 (the display 14a). In addition, the image of the second partial region 22 displayed on the display unit 14 has information that indicates (a position of) the first partial region 21 in the second partial region 22. Accordingly, because a user can see the measurement region as well as a periphery thereof by the display unit 14, it is possible to easily and correctly position the measuring apparatus 10 so that the measurement region is arranged on the target region. Here, the second partial region 22 is a region that includes the first partial region 21 and is larger than the first partial region 21 (has a larger area), but it may be smaller than the opening 17, and may be the same size as the opening 17. In addition, information that indicates the position of the first partial region 21 in the second partial region 22 is referred to below as "position information of the first partial region 21".

Explanation is given below of a configuration of the imaging unit 13 of the present embodiment, and a method for measuring a reflection characteristic of the measurement target surface 20 by using the measuring apparatus 10 of the present embodiment.

Firstly, explanation is given regarding a configuration of the imaging unit 13. As illustrated in FIG. 3, the imaging unit 13 has, for example, a light source 13a for irradiating light onto the second partial region 22 and a camera 13b for sensing the second partial region 22 onto which light is irradiated. In the present embodiment, light is diagonally irradiated onto the second partial region 22, and the light source 13a and the camera 13b are arranged so as to diagonally sense the second partial region 22. Specifically, the light source 13a is turned on and the measurement target surface and the wider second partial region (an imaging region) are captured from a diagonal direction by the camera 13b. The cross section of FIG. 3 at this time includes a normal line of an image sensing plane (an image sensing element surface) included in the camera 13b (or an optical axis of an imaging optical system arranged between the camera 13b and the measurement target surface), and is a cross section (a plane) that is parallel to the normal line of the measurement target surface. Furthermore, it is desirable that the cross section (plane) of FIG. 3 forms an angle of greater than or equal to 45 degrees and less than or equal to 135 degrees (more desirably greater than or equal to 75 degrees and less than or equal to 105 degrees, and even more desirably greater than or equal to 85 degrees and less than or equal to 95 degrees) with respect to the cross section of FIG. 2. By such a configuration, it is possible to allow for miniaturization of the apparatus as a whole.

In addition, the light source 13a is arranged so that an angle (an illumination angle α) at which a principal ray of light from the light source 13a caused to be incident on the second partial region 22 is 60 degrees, and the camera 13b is arranged so that an angle (an imaging angle at which the second partial region 22 is sensed is 45 degrees. In other words, the light source 13a and the camera 13b are arranged so that the imaging angle β is smaller than the illumination angle α. It is possible to arbitrarily set the illumination angle α and the imaging angle β, but such an arrangement of the light source 13a and the camera 13b is advantageous when space in the housing is narrow. It is possible to arrange the light source 13a and the camera 13b so that the second partial region 22 is irradiated with light from above and the second partial region 22 is sensed from above if there is wide space in the housing and there is no interference with the housing 11.

The light source 13a irradiates light onto the second partial region 22 (illuminates the second partial region 22). The light source 13a is connected to the light source control circuit 13c, and a light emission intensity can be adjusted in accordance with a signal sent from the control unit 16 to the light source control circuit 13c. It is desirable for a light source (for example, an LED or the like) having directivity characteristics of an angle γ or more to be used as the light source 13a, so that light is irradiated onto the entirety of the second partial region 22 which is decided in accordance with the angle of view of the camera 13b and an arrangement of the camera 13b with respect to the opening 17. The light source 13a of the present embodiment is configured so as to irradiate light onto the second partial region 22 from a direction orthogonal to a direction (an azimuth direction) in which the detecting unit 12 irradiates light onto the first partial region 21, but the direction in which light is irradiated onto the second partial region 22 can be arbitrarily set.

In addition, the camera 13b is configured by a CCD camera, a CMOS camera, or the like for example, senses the second partial region 22 that is illuminated by the light source 13a, and outputs image data (video data) of the second partial region 22 that is obtained thereby. The image (video image) obtained by the imaging unit 13 is displayed on the display unit 14 (the display 14a).

Figure 4:
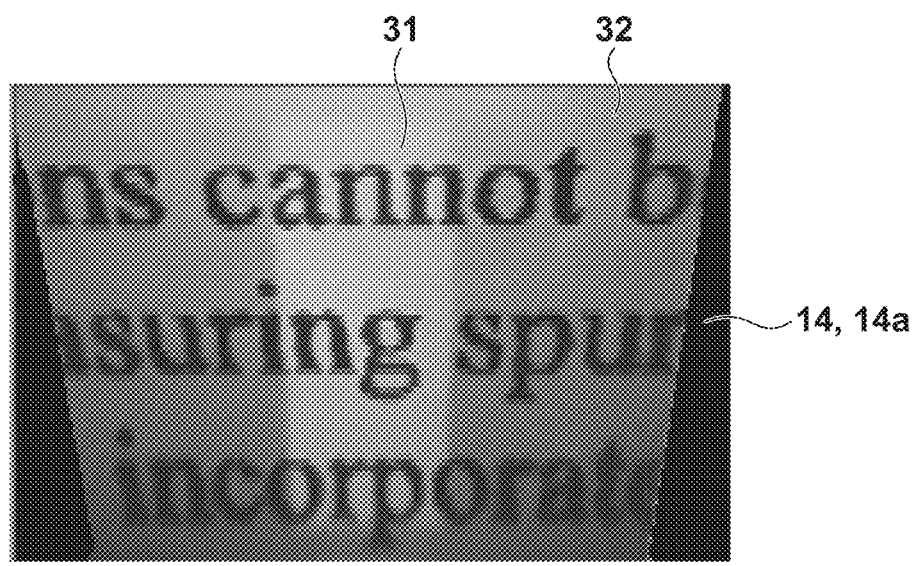
FIG. 4 is a view illustrating an image of a second partial region.

The image of the second partial region 22 displayed on the display unit 14 has position information of the first partial region 21, as described above. As one method of generating an image of the second partial region 22 that has position information of the first partial region 21, for example there is a method in which, while light is irradiated onto the first partial region 21 by the detecting unit 12, the second partial region 22 is sensed by irradiating light onto the second partial region 22 by the imaging unit 13. In this method, a region other than the first partial region 21 in the second partial region 22 is irradiated by only light from the imaging unit 13, and the first partial region 21 is irradiated by both of light from the imaging unit 13 and light from the detecting unit 12. Therefore, in an image of the second partial region 22 that is obtained by the imaging unit 13 and displayed on the display unit 14, as illustrated in FIG. 4, the brightness of a portion 31 that corresponds to the first partial region 21 is greater than the brightness of a remaining portion 32 (a periphery). In other words, it is possible to generate a difference in brightnesses of the portion 31 that corresponds to the first partial region 21 and the remaining portion 32 as position information of the first partial region 21.

In addition, in an image of the second partial region 22 displayed on the display unit 14, the contrast of the portion 31 that corresponds to the first partial region 21 (the measurement region) may be set higher than the contrast of the remaining portion (the periphery). Alternatively, the brightness of the portion 31 may be set smaller than the brightness of the remaining portion 32. Specifically, configuration may be taken to illuminate the first partial region 21 by visible light (for example, by using a light source that is different to the light source for sensing), and turn off the light source for illuminating the outside of the first partial region 21. In addition, to make it easier to see the first partial region 21, configuration may be taken to perform image processing so as to surround the portion 31 that corresponds to the first partial region 21 by a frame in the image of the second partial region that is displayed in the display unit 14.

FIG. 4 is a view that illustrates an image of the second partial region 22 that is displayed in the display unit 14. In the present embodiment, because the second partial region 22 is diagonally sensed by the imaging unit 13, the image of the second partial region 22 that is displayed in the display unit 14 is a trapezoidal shape. In addition, in the image of the second partial region 22 illustrated in FIG. 4, it is possible to see the position of the first partial region (the measurement region) in the image because the brightness of the portion 31 that corresponds to the first partial region 21 is greater than that of the portion 32 which is a periphery of the portion 31. Here, the intensity of the light irradiated onto the second partial region 22 by the imaging unit 13 may be smaller than the intensity of the light irradiated onto the first partial region 21 by the detecting unit 12. Accordingly, it is possible to further make it easier to see the position of the first partial region 21 in the image of the second partial region 22 displayed by the display unit 14 by making the difference of brightnesses of the portion 31 and the portion 32 in the image large.

Figure 5:
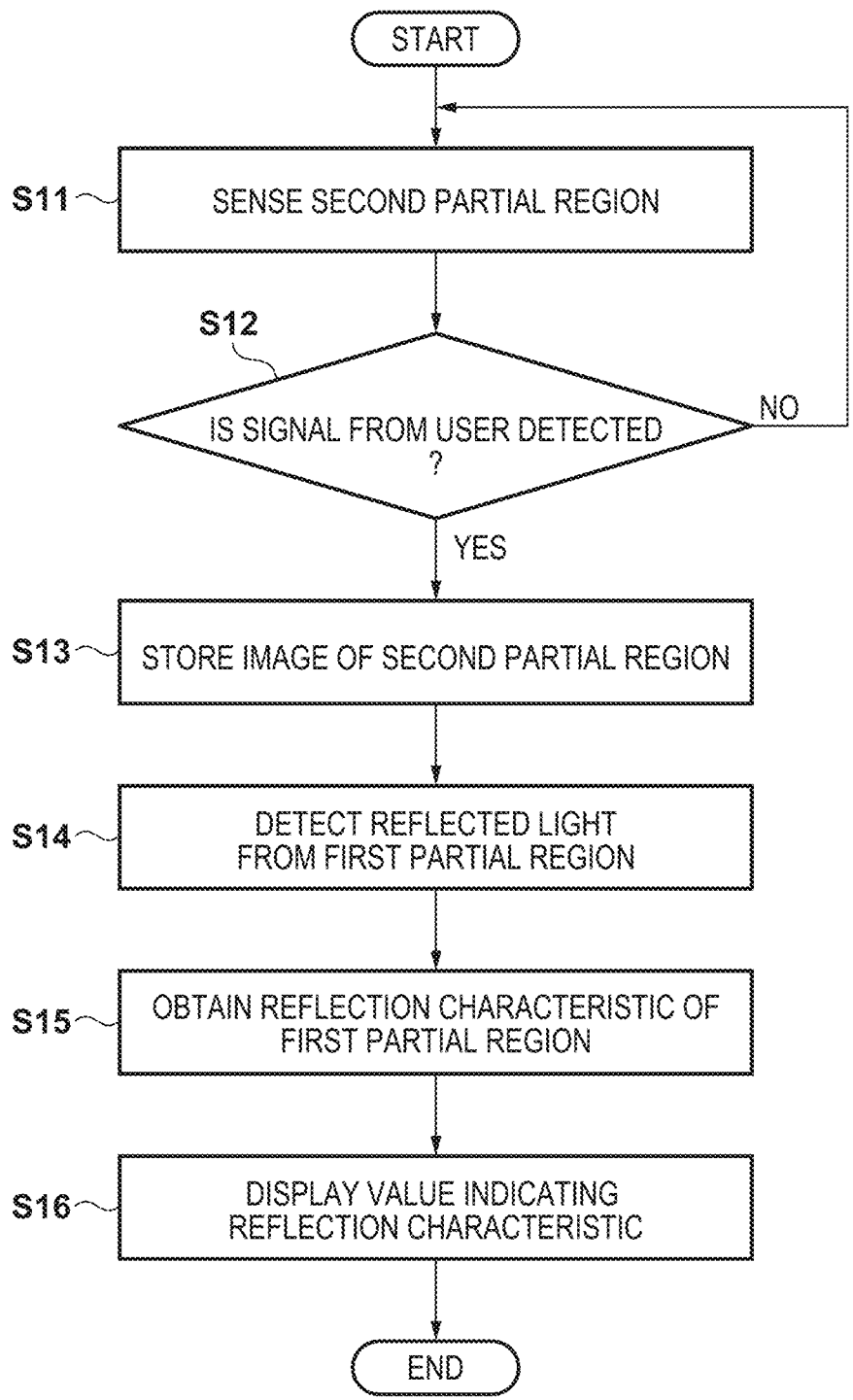
FIG. 5 is a flowchart for describing a method for measuring reflection characteristics of a measurement target surface.

Next, with reference to FIG. 5, explanation is given regarding a method of measuring the reflection characteristic of the measurement target surface 20 by using the measuring apparatus 10. FIG. 5 is a flowchart for describing a method for measuring reflection characteristics of the measurement target surface 20. Each step of the flowchart illustrated in FIG. 5 can be controlled by the control unit 16.

In step S11, the control unit 16 irradiates light from the detecting unit 12 onto the first partial region 21, and causes the imaging unit 13 to sense the second partial region 22 in a state where light from the imaging unit is irradiating the second partial region 22. The image (video image) of the second partial region 22 obtained by the imaging unit 13 is displayed on the display unit 14. In step S12, the control unit 16 determines whether a signal from a user is detected. The processing returns to step S11 in a case where the control unit 16 does not detect a signal from a user, and the processing proceeds to step S13 in a case where the control unit 16 detects a signal from a user.

In the steps of step S11 and step S12, a state is entered in which a user positions the measuring apparatus 10 so that the measurement region (the first partial region 21) of the measuring apparatus 10 is arranged on a target region of the measurement target surface 20 for which a reflection characteristic is to be measured, based on an image displayed on the display unit 14. When positioning of the measuring apparatus 10 ends, for example, the user operates a sensor of the operating unit 15 (presses the button 15a in the present embodiment) to cause the measuring apparatus 10 to start measurement of the reflection characteristic. At this point, in the measuring apparatus 10, output from the sensor (the button 15a) is transmitted to the control unit 16, and the control unit 16 can detect the output as a signal from a user (a signal inputted from the operating unit 15). In the present embodiment, the button 15a is used as the sensor, but there is no limitation to this, and, for example, an optical sensor or a temperature sensor for perceiving a touch of a user's hand (finger) may be used. In addition, in the present embodiment, output of a sensor when a user touched the sensor (when the user pressed the button 15a) is used as a signal from a user. However, there is no limitation to this, and, for example, output of the sensor when the user has released their hand from the sensor (when the pushed button 15a is released) may be used as the signal from the user.

Figure 6:
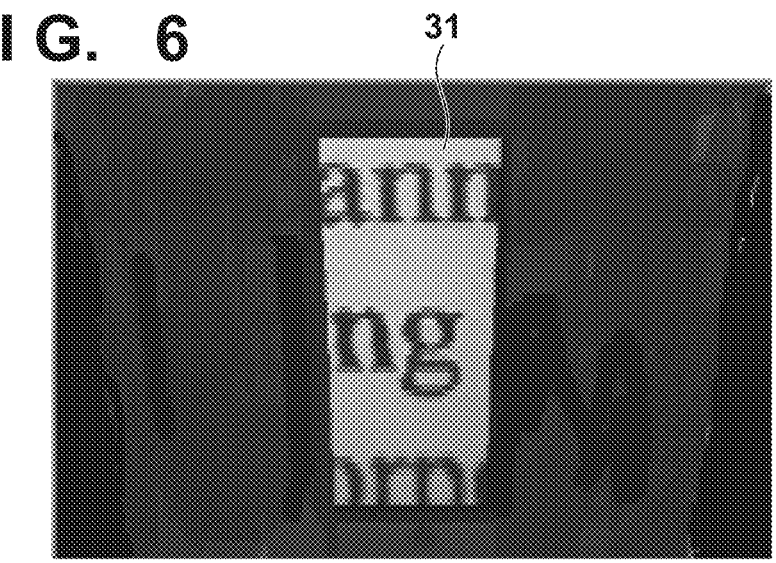
FIG. 6 is a view illustrating an image of the second partial region.

In step S13, the control unit 16 stores an image of the second partial region 22 that was sensed by the imaging unit 13 when the sensor (the button 15a) was operated by a user (when the signal from the user was detected) and that was displayed on the display unit 14 in a memory (a storage unit). In step S14, to prevent light other than light from the detecting unit 12 entering the sensor of the detecting unit 12, the control unit 16 ends (interrupts) irradiation of light onto the second partial region 22 by the imaging unit 13, and irradiates the first partial region 21 by only light from the detecting unit 12. The control unit 16 causes the detecting unit 12 (the sensor 12d) to detect light reflected by the first partial region 21. FIG. 6 is a view that illustrates an image of the second partial region 22 obtained by the imaging unit 13 in a state in which only light from the detecting unit 12 is irradiating the first partial region 21. Configuration may be taken such that an image of the second partial region 22 obtained in this way is caused to be displayed on the display unit 14, or is not caused to be displayed. Here, when a plurality of detecting units 12 are provided in the measuring apparatus 10, the control unit 16 causes each detecting unit 12 to perform a step for irradiating the first partial region 21 with light and detecting light reflected by the first partial region 21 in order.

In step S15, the control unit 16 obtains a reflection characteristic of the first partial region 21 based on a detection result (intensity distribution data of reflected light that is outputted from the sensor 12d) by the detecting unit 12. At this point, the control unit 16 stores in the memory the obtained reflection characteristic in association with the image of the second partial region 22 that was stored in the memory in step S13. Accordingly, a user can easily grasp which region on the measurement target surface the reflection characteristic stored in the memory is for. In step S16, the control unit 16 displays a value indicating the reflection characteristic obtained in step S15 on the display unit 14. At this point, the control unit 16 may superimpose and display the image of the second partial region 22 stored in the memory in step S13 and the value indicating the reflection characteristic on the display unit 14, or may display only the value indicating the reflection characteristic on the display unit 14. In the latter case, the control unit 16 causes the image of the second partial region 22 to be displayed on the display unit 14 before detecting the signal from the user, and displays on the display unit 14 the value indicating the reflection characteristic after detecting the signal from the user. In other words, the control unit 16 causes the display unit 14 to (selectively) switch between displaying the image of the second partial region 22 and the value indicating the reflection characteristic, in accordance with the signal from the user.

A single measurement of a reflection characteristic in accordance with these steps ends, but after a predetermined amount of time (for example, three seconds or the like) has passed, the control unit 16 returns to step S11 and causes an image (a video image) of the second partial region 22 obtained by the imaging unit 13 to be displayed on the display unit 14. Accordingly, a user can continue to perform measurement of a reflection characteristic of the measurement target surface 20.

As described above, the measuring apparatus 10 of the present embodiment senses, out of a region of the measurement target surface 20 where the opening 17 is positioned, the second partial region 22 that includes the first partial region 21 for which measurement of a reflection characteristic is performed, and displays an image of the second partial region 22 obtained thereby on the display unit 14. The image of the second partial region 22 displayed on the display unit 14 has position information of the first partial region 21. Accordingly, because a user can easily see the measurement region in accordance with the display unit 14, the user can easily position the measuring apparatus 10 so that the first partial region 21 (the measurement region) is arranged on the target region of the measurement target surface 20 for which a reflection characteristic is to be measured.

Here, the measuring apparatus 10 of the present embodiment starts measurement of a reflection characteristic in accordance with detecting output from the button 15a of the operating unit 15 as a signal from a user, but there is no limitation to this. For example, measurement of a reflection characteristic may be started in accordance with detecting a signal from a user that is sent (received), for example via a cable or wirelessly, from an apparatus (for example, an information processing apparatus) that is arranged outside of the housing 11. In such a case, the control unit 16 detects a signal inputted by an input unit (a keyboard, a mouse, or the like) of the apparatus as a signal from a user. In addition, the measuring apparatus 10 of the present embodiment associates and stores the image of the second partial region 22 and the value that indicates the reflection characteristic in the control unit 16 (a memory), but there is no limitation to this. For example, configuration may be taken to transmit, via a cable or wirelessly, the image of the second partial region and the value of the reflection characteristic, in association, to an apparatus arranged outside of the housing 11, and store them in the apparatus. In this way, an apparatus arranged outside of the housing 11 may be one configuration element in the measuring apparatus 10.

Furthermore, in the present embodiment, the display 14a that is provided in the housing 11 was used as the display unit 14 for displaying the image of the second partial region 22 obtained by the imaging unit 13, but there is no limitation to this, and, for example, an external display unit provided outside of the housing 11 may be used as a display unit. In such a case, the control unit 16 transmits, via a cable or wirelessly, the image data of the second partial region 22 obtained by the imaging unit 13 to the external display, and displays it on the external display. In this way, an external display arranged outside of the housing 11 may be one configuration element in the measuring apparatus 10.

Second Embodiment

Explanation is given regarding a measuring apparatus of a second embodiment according to the present invention. In the measuring apparatus 10 of the first embodiment, because the second partial region 22 is diagonally sensed by the imaging unit 13 and an image obtained thereby is displayed on the display unit 14 unchanged, and the image of the second partial region 22 that is displayed on the display unit 14 is a trapezoidal shape as illustrated in FIG. 4. In the present embodiment, explanation is given regarding an example in which geometrical image conversion is performed on the trapezoidal shape image obtained by diagonally sensing the second partial region 22 by the imaging unit 13, and an image for which image conversion has been performed is displayed on the display unit 14. Because other configurations are the same as in the first embodiment, explanation thereof is omitted here.

Explanation is given below regarding an image conversion method in which an image obtained by sensing the second partial region 22 at an imaging angle β, of 45 degrees by the imaging unit 13 is converted to an image as if the second partial region 22 was sensed by an imaging angle β, of 0 degrees (for example, a rectangular-shaped image). The image conversion is performed by the control unit 16 (a processor).

The control unit 16 performs coordinate conversion by applying a projective transformation to image data obtained by the imaging unit 13. The projective transformation is one kind of coordinate conversion that is applied when correcting a distorted rectangular image to a rectangular-shaped (a square or a rectangle) image. In the image data, letting coordinates before the conversion be (x, y) and coordinates after the conversion be (x', y'), it is possible to obtain the coordinates after the conversion by Equation (1). Here $h_{11}$ through $h_{33}$ are conversion coefficients obtained from four coordinate points before the conversion and four coordinate points after the conversion.

$$\begin{pmatrix} x' \\ y' \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x \\ y \\ 1 \end{pmatrix} \quad (1)$$

Next, the control unit 16 performs a pixel interpolation for the image for which the coordinate conversion is performed in accordance with the projective transformation. In a case of geometrically converting an image, it is necessary to perform a so-called pixel interpolation in which image filter processing that refers to a luminance value between pixels is performed to compensate for pixel data that corresponds to the space therebetween. Here, the pixel interpolation is performed by further applying a bilinear interpolation to the image data for which the projective transformation was performed by the control unit 16. The bilinear interpolation is one kind of a linear interpolation for obtaining a luminance value by linearly interpolating using 2×2 pixels (four pixels) on the periphery of the coordinates (x', y') of a pixel to be compensated.

Figure 7:
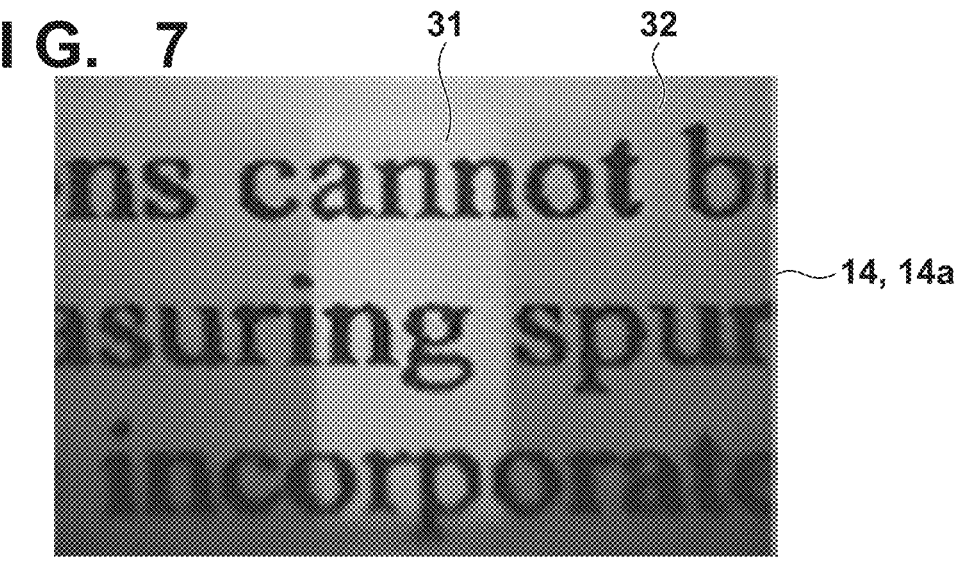
FIG. 7 is a view illustrating an image of the second partial region.

In this way, geometrical image conversion (coordinate conversion using projective transformation, and pixel interpolation using bilinear interpolation) is performed with respect to an image of the second partial region 22 that is obtained by the imaging unit 13. Accordingly, it is possible to convert a trapezoidal-shaped image as illustrated in FIG. 4 to a rectangular-shaped image as illustrated on FIG. 7, and display it on the display unit 14. FIG. 7 is a view that illustrates an image of the second partial region 22 that is displayed on the display unit 14 after a geometrical image conversion has been performed with respect to an image of the second partial region 22 obtained by the imaging unit 13.

Here, in the present embodiment, a projective transformation was used as a coordinate conversion in the geometrical image conversion, but there is no limitation to this. For example, it is possible to use an affine transformation or the like in a case of performing a coordinate conversion in accordance with a parallel translation and a linear conversion. In addition, in the present embodiment, a bilinear interpolation was used as the pixel interpolation, but it is possible to use a nearest-neighbor interpolation or the like. A nearest-neighbor interpolation is a method that refers to the luminance value of a pixel that is at a position closest to the position of a pixel to interpolate, and while data of an interpolated pixel is a luminance value that differs to that for a bilinear interpolation, it is possible to perform pixel interpolation similar to that with a bilinear interpolation. Furthermore, in the present embodiment, explanation was given regarding an example in which a geometrical image conversion is performed with respect to an image obtained by sensing the second partial region 22 at an imaging angle β, of 45 degrees by the imaging unit 13. However, there is no limitation to this, and it is possible to obtain an image similar to the image illustrated in FIG. 7 by performing the geometrical image conversion described above even with respect to an image obtained by sensing at an imaging angle β, that is not 45 degrees.

As described above, in the present embodiment, a geometrical image conversion is performed on an image of the second partial region 22 obtained by the imaging unit 13, and an image obtained thereby is displayed on the display unit 14. Accordingly, it is possible to further improve visual perceptibility of a measurement region (the first partial region 21) for a user.

Third Embodiment

Figure 8:
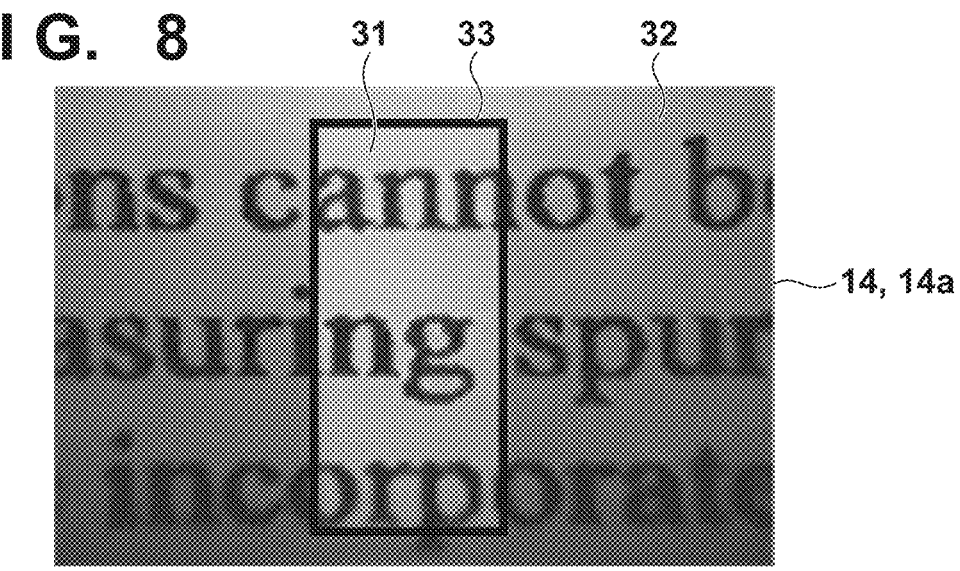
FIG. 8 is a view illustrating an image of the second partial region.

Explanation is given regarding a measuring apparatus of a third embodiment according to the present invention. In the first embodiment, explanation was given regarding a method of sensing the second partial region 22 while the first partial region 21 is irradiated with light by the detecting unit 12, as one method of generating an image of the second partial region 22 that has position information of the first partial region 21. In the present embodiment, explanation is given regarding a method of generating an image of the second partial region 22 that has position information of the first partial region 21 by displaying an image of the second partial region 22 obtained by the imaging unit 13 and superimposed with a mark 33 that indicates a position of the first partial region 21, as illustrated in FIG. 8. Because other configurations are the same as in the first embodiment, explanation thereof is omitted here.

Firstly, explanation is given regarding one example of a method for displaying the mark 33 that indicates the position of the first partial region 21. The position of the first partial region 21 in the second partial region 22 usually does not change even if the target region for which a reflection characteristic is to be measured has changed. Therefore, configuration may be taken to obtain in advance a position on the display unit 14 at which the first partial region 21 is to be displayed, display an image of the second partial region 22 obtained by the imaging unit 13 on the display unit 14, and display the mark 33 at the position on the display unit 14 that was obtained in advance by superimposing. In such a case, the imaging unit 13 does not need to sense the second partial region 22 while light is irradiated on the first partial region 21 by the detecting unit 12. In other words, configuration may be taken such that the imaging unit 13 senses the second partial region 22 by performing only irradiation of light onto the second partial region 22 by the imaging unit 13 and without performing irradiation of light onto the first partial region 21 by the detecting unit 12.

Here the mark 33 that indicates the position of the first partial region 21 comprises a mark that indicates an outer shape (contour) of the first partial region 21 for example, but may comprise another mark such as a mark that indicates the four corners of the first partial region 21, for example. In addition, configuration may be taken to use a method that emphasizes the position of the first partial region 21, for example by making luminance values of the first partial region 21 larger or smaller than that of a periphery, and does not use a mark that indicates the position of the first partial region 21. The same is also true for the following examples.

Next, explanation is given regarding another example of a method for displaying the mark 33 that indicates the position of the first partial region 21. Explanation is given here of an example for obtaining a position of the first partial region 21 in the second partial region 22 from an image obtained by sensing the second partial region 22 while light is irradiated onto the first partial region 21 by the detecting unit 12, and displaying the mark 33 that indicates the position on the display unit 14. Explanation is given below of method for obtaining, by the control unit 16, the outer shape (contour) of the first partial region 21 as the position of the first partial region 21.

The control unit 16 applies a contour extraction to image data obtained by the imaging unit 13 to perform an extraction of the first partial region 21. A contour extraction is one type of image processing that is applied when extracting a portion where a luminance of pixels discontinuously changes, based on a result of calculating a luminance gradient of pixels in the image data. Discussion is given here regarding a method of extracting a contour by performing a first derivative by obtaining a difference between adjacent pixels in the X direction and the Y direction of a pixel in the image data, but there are various methods for a contour extraction. For example, it is also possible to perform a contour extraction that does not depend on directionality by performing a second derivative for the four directions of up, down, left and right with respect to a pixel of interest for the contour extraction.

In the image data, letting a pixel at the coordinates (x, y) be a pixel of interest for a contour extraction and letting a luminance value of that pixel be obtained by f(x, y), it is possible to obtain a derivative value fx for the X direction and a derivative value fy for the Y direction by Equation (2). In addition, from the derivative values fx and fy obtained by Equation (2), it is possible to calculate an intensity I of a contour at the coordinates (x, y) by using Equation (3). Accordingly, the control unit 16 can extract the first partial region 21 by using the intensity I of the contour calculated by Equation (3), and can cause the mark 33 that indicates the extracted position of the first partial region 21 to be displayed on the display unit 14.

$$f_x = f(x+1,y) - f(x,y)$$

$$f_y = f(x,y+1) - f(x,y) \qquad (2)$$

$$I = |f_x| + |f_y| \qquad (3)$$

As described above, in the present embodiment, the mark 33 that indicates the position of the first partial region 21 in the second partial region 22 is superimposed on the image of the second partial region 22 obtained by the imaging unit 13, and displayed on the display unit 14. Accordingly, a visibility of user's measurement region (the first partial region 21) can be further improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207260 filed on Oct. 21, 2016, which is hereby incorporated by reference herein in its entirety.

What is claimed is:
1. A measuring apparatus capable of measuring a reflection characteristic of a surface, the apparatus comprising:
a housing in which an opening is formed, the measuring apparatus being configured to measure the reflection characteristic of the surface via the opening in a state where a measurement region of the surface is concealed by the housing;

an imaging unit provided in the housing, and configured to irradiate an imaging region of the surface with light and capture an image of the imaging region, via the opening;

a detector provided in the housing, and configured to irradiate the measurement region with light and detect light reflected from the measurement region, via the opening, the measurement region being a portion of the imaging region; and a processor configured to obtain a reflection characteristic of the measurement region based on the light detected by the detector, wherein the processor is configured to output the image of the imaging region including information indicating a position of the measurement region in the imaging region to a display which displays the image of the imaging region, and wherein the imaging unit is configured to capture the image of the imaging region by irradiating the imaging region other than the measurement region with light of an intensity lower than an intensity of light irradiated onto the measurement region.

2. The measuring apparatus according to claim 1, wherein an angle formed between a first plane and a second plane is greater than or equal to 45 degrees and less than or equal to 135 degrees, the first plane being defined as a plane which is perpendicular to the measurement region and includes a nominal line to a detection surface of the detector, the second plane being defined as a plane which is perpendicular to the measurement region and includes a normal line to an image sensing surface of the imaging unit.

3. The measuring apparatus according to claim 1, wherein an image sensing element included in the imaging unit and a light receiving element included in the detector are configured by mutually separate bodies.

4. The measuring apparatus according to claim 1, wherein the image of the imaging region including the information is generated by setting a contrast of a portion corresponding to the measurement region among the image higher than a contrast of another portion of the image outside the portion corresponding to the measurement region.

5. The measuring apparatus according to claim 1, wherein the display unit is configured to further display the reflection characteristic obtained by the processor.

6. The measuring apparatus according to claim 1, further comprising an input unit configured to be operated by a user, wherein the processor is configured to obtain the reflection characteristic based on a signal inputted by the input unit.

7. The measuring apparatus according to claim 1, further comprising an input unit configured to be operated by a user, wherein the processor is configured to cause the display unit to selectively display the reflection characteristic and the image of the imaging region captured by the imaging unit, based on a signal inputted by the input unit.

8. The measuring apparatus according to claim 1, wherein the processor is configured to store the image of the imaging region displayed by the display unit and the reflection characteristic in association with each other.

9. The measuring apparatus according to claim 1, wherein the image of the imaging region including the information is generated by irradiating the imaging region with light and capturing the image of the imaging region in a state of irradiating the measurement region with light by the detector.

10. A measuring apparatus capable of measuring a reflection characteristic of a surface, the apparatus comprising:

a housing in which an opening is formed, the measuring apparatus being configured to measure the reflection characteristic of the surface via the opening in a state where a measurement region of the surface is concealed by the housing;

an imaging unit provided in the housing, and configured to irradiate an imaging region of the surface with light and capture an image of the imaging region, via the opening;

a detector provided in the housing, and configured to irradiate the measurement region with light and detect light reflected from the measurement region, via the opening, the measurement region being a portion of the imaging region; and a processor configured to obtain a reflection characteristic of the measurement region based on the light detected by the detector, wherein the processor is configured to output the image of the imaging region captured by the imaging unit with a superimposed mark that indicates an outer shape of a portion corresponding to the measurement region to a display which displays the image of the imaging region.

11. The measuring apparatus according to claim 1, wherein the display unit includes a display that is provided in the housing.

12. The measuring apparatus according to claim 1, further comprising an input unit configured to be operated by a user, wherein the display unit and the input unit are provided adjacent to each other on the housing.

13. The measuring apparatus according to claim 1, further comprising:

an input unit configured to be operated by a user, and a grip portion that is gripped by a user, wherein the input unit and the grip portion are provided adjacent to each other on the housing.

14. The measuring apparatus according to claim 1, wherein the reflection characteristic includes at least one of a specular gloss, a haze, a DOI, and image clarity.

15. The measurement apparatus according to claim 1, wherein the imaging region includes the measurement region and is larger than the measurement region.

16. The measuring apparatus according to claim 1, wherein the image of the imaging region including the information is generated such that the measurement region is visually distinguished from a portion outside the measurement region among the imaging region.

17. The measurement apparatus according to claim 1, wherein the imaging unit is configured to interrupt irradiating the imaging region with the light, while the detector detects light reflected from the measurement region for measuring the reflection characteristic of the measurement region.

18. The measurement apparatus according to claim 1, wherein the housing is configured to be movable on the surface in a state of being gripped by a user.

* * * * *